3,510,542
POLYVINYL ALCOHOL PLASTICIZED WITH AN ALKANOL AMINE SALT OF A POLYALKYLENE GLYCOL - ESTERIFIED STYRENE/MALEIC ANHYDRIDE COPOLYMER
Robert C. Strand, Homewood, Ill., assignor to Sinclair Research, Inc., New York, N.Y., a corporation of Delaware
No Drawing. Filed Feb. 23, 1967, Ser. No. 617,799
Int. Cl. C08f 29/30, 19/02
U.S. Cl. 260—874                 10 Claims

ABSTRACT OF THE DISCLOSURE

Polyvinyl alcohol is plasticized with a minor amount of an alkanol amine salt of a polyalkylene glycolesterified styrene/maleic anhydride copolymer. The amine is polyhydroxyl-containing and a member of certain specific classes of amines including, for example, N,N,N',N'-tetra (hydroxyethyl) ethylene diamine, tris (hydroxymethyl) aminomethane, and 2-amino-2-methylpropane-1,3-diol. The copolymer is about 10–100% half-esterified with the polyalkylene glycol, which is capped on one end with an alkyl radical of 1 to about 5 carbon atoms. The resulting compositions are useful for the production of cast films from aqueous solutions, which films find application in the packaging of laundry detergents, bleaches and softeners, for instance.

---

The present invention relates to polyvinyl alcohol resin compositions exhibiting high elongation and tensile strength. More particularly, the invention is directed to polyvinyl alcohol resins containing as plasticizers certain alkanol amine salts of styrene/maleic anhydride resins.

The use of partially esterified copolymers of styrene and maleic anhydride as extenders for polyvinyl alcohol resins allows for a reduction in resin cost while still maintaining desirable physical properties such as high elongation and tensile strength in films formed with the extended resins. However, to actually improve or increase flexibility and elongation of these extended polyvinyl alcohol resins, it has been necessary to incorporate along with the modified styrene/maleic anhydride resin an external plasticizer such as glycerol, triethylene glycol, or like polyols. Unfortunately, since these external plasticizer systems are merely physical admixtures, they do have an undesirable feature in that the plasticizing agents tend to migrate from the base resin thereby losing their effectiveness. Films of polyvinyl alcohol become brittle when exposed to low humidity conditions because of plasticizer migration.

I have now discovered that certain alkanol amine salts of partially esterified styrene/maleic anhydride resins when blended with polyvinyl alcohol resins provide a composition which not only exhibits the advantageous elongation and tensile strength demonstrated by the aforementioned polyol-styrene/maleic anhydride resin-polyvinyl alcohol system but which does not require the addition of the polyol external plasticizer and, therefore, does not manifest the plasticizer migration problem. The alkanol amine salts of the partially esterified styrene/maleic anhydride copolymer when blended with polyvinyl alcohol resins form an internal plasticizer system, that is, the alkanol amine salt of the styrene/maleic anhydride resin apparently becomes chemically bonded to the polyvinyl alcohol resin and will not migrate therefrom.

The alkanol amines which are used to form the salts of the present invention are selected from compounds having the following structural formulae:

(1) 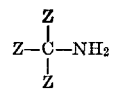

or (2) 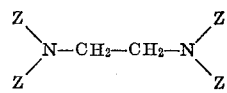

wherein Z is selected from hydrogen, a lower alkyl, say of 1 to 4 carbon atoms, and a lower hydroxylalkyl, with the proviso that at least two of the Z groups are lower hydroxyalkyls. Examples of suitable alcohol amines are N,N,N',N'-tetra (hydroxyethyl) ethylene diamine; N,N'-bis (hydroxymethyl) ethylene diamine; N,N'-bis (hydroxypropyl) ethylene diamine; N,N'-bis (hydroxybutyl)-N-methylethylene diamine; tris (hydroxymethyl) amino methane; 2-amino-2-methylpropane-1,3-diol; 3-amino-3-propylpentane-1,5-diol; 4-amino-4-ethylheptane-1,7-diol; 2-amino-2-methylpentane-1,5-diol.

The styrene/maleic anhydride resin, the alcohol amine salt of the partial ester of which is employed in the invention, is a resinous copolymer of styrene and maleic anhydride having about 1 to 4, preferably about 1 to 3, moles of styrene per mole of maleic anhydride, and often about equimolar quantities of styrene and maleic anhydride. The molecular weights of the unesterified copolymers are generally at least about 400 up to about 10,000 but can be of higher molecular weight as long as the alcohol amine salt of the partial ester thereof is water soluble. A 10 weight percent solution in acetone of the unesterified copolymer generally exhibits a viscosity at 30° C. of about 0.5 to 3 centistokes, with viscosities in the range of about 0.52 to 1 cs. often being preferred. The melting points of the unesterified copolymers will generally range from about 80 to 200° C. as determined by the Fisher-Johns Melting Point Apparatus.

The styrene/maleic anhydride copolymers can be prepared by known methods of the art. A preferred method is by solution polymerization where the monomers are polymerized in a suitable solvent employing as a polymerization catalyst a free-radical peroxide catalyst, preferably benzoyl peroxide or dicumyl peroxide, at a temperature of about 75 to 300° C. or more. Suitable solvents include the aromatic hydrocarbon solvents such as cumene, p-cymene, xylene, toluene, etc. The aromatic solvents may be chain-terminating solvents and may be used to give lower molecular weight products. Other suitable solvents are the ketones, such as methylethylketone, which are also active solvents. The preferred manner of carrying out the polymerization is by what can be called incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the copolymers causes a heterogeneous system, the polymer layer being the heavier layer and recoverable by merely decanting the upper aromatic solvent layer and drying the residue. On the other hand, when a ketone is the solvent, the formed copolymer is usually soluble in the solvent media so that recovery of the products may involve a solvent-stripping operation.

The alcohol employed in the esterification of the styrene/maleic anhydride copolymer will be a capped polyalkylene glycol corresponding to the following general formula:

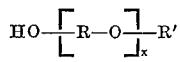

wherein R is an alkylene radical of 2 to about 5, preferably 2 to 3 carbon atoms, R' is a monovalent alkyl (including cycloalkyl) radicals of 1 to about 5 carbon atoms and x is 2 to about 20 preferably 2 to about 10. As specific examples of suitable polyalkylene glycols may be mentioned polyethylene and polypropylene glycols having molecular weights of about 300 to 800 and capped on one end with a lower alkyl group such as methyl.

The extent of half-esterification of the styrene-maleic anhydride copolymer will generally be about 10 to 100%, preferably about 20 to 80%. That is, about 5 to 50%, preferably about 10 to 40%, of the total number of carboxyl groups of the copolymer are esterified with the alcohol. The esterification can be effected by simply heating a mixture of the appropriate quantities of styrene-maleic anhydride copolymer and alcohol at elevated temperatures, usually about 100° to 200° C., often about 170 to 180° C.

Formation of the alkanol amine salts of the copolymer can be accomplished by simply neutralizing the copolymer with the alcohol amine by blending the components, advantageously in aqueous media, under ambient conditions of temperature and pressure. Sufficient alkanol amine will be employed to effect water-solubility which often requires salt formation with about 50 to 90% of the unesterified carboxyl groups of the copolymer. Often about 5 to 25% of the alcohol amine, based on the weight of the styrene-maleic anhydride resin, will be employed in the neutralization.

The alcohol amine salt of the partially esterified copolymer is blended with the polyvinyl alcohol resin in minor amounts sufficient to improve tensile strength and elongation. The amounts actually employed will vary depending upon the particular use to which the polyvinyl alcohol resin is to be put, but in most cases will be about 5 to 40%, preferably about 25 to 35%, based on the combined weight of the polyvinyl alcohol and the copolymer. The blending of the alcohol amine salt of the esterified copolymer and the polyvinyl alcohol can be conducted by heating the two, either in admixture or in solution in a suitable solvent, such as water, at an elevated temperature, usually about 30 to 80° C.

The polyvinyl alcohol resins which constitute the major component of the composition of the present invention are synthetic resins, well known to the art, which have found a variety of uses such as the preparation of synthetic films and fibers and as intermediates for the preparation of polyvinyl butyral, which is used in laminated safety glass. The resins are most often prepared by first polymerizing monomeric vinyl esters of organic monocarboxylic acids of 1 to 20 carbon atoms, for instance, vinyl acetate, vinyl propionate, vinyl stearate, vinyl benzoate and the like, or mixtures thereof, utilizing peroxide-initiators (both inorganic and organic peroxides) to produce a polyvinyl ester. The polymerization is usually conducted at the reflux temperature of the vinyl ester reaction mixture and the amount of catalyst controlled so that the polymerization reaction terminates at the desired conversion of the vinyl ester to polyvinyl ester. The resulting polyvinyl ester is then at least about 75% hydrolyzed, often at least about 90% hydroylzed, to form the polyvinyl alcohol. The polyvinyl alcohol resins ordinarily will possess a viscosity on the order of about 25 up to 300 or more centipoises as measured in a 4 weight percent aqueous solution at 20° C.

The composition of the present invention are ideally suited, due to their water-solubility and component compatibility, for the production of cast films from aqueous solution. Preferred film casting solutions may contain up to about 25 weight percent of combined polyvinyl alcohol and copolymer salt. Often about a 15–20% solution is most preferred. The films find application, for example, in the packaging of laundry detergents, bleaches, softeners, and numerous other applications that will be readily apparent to one skilled in the art.

The following examples are included to further illustrate the present invention:

EXAMPLE I

A mixture of 202 grams of an approximately equimolar styrene/maleic anhydride copolymer having an average molecular weight of about 1450 (viscosity at 30° C. of 10% acetone solution being about 0.68 to 0.72 cs.) and 175 grams of methoxy polyethylene glycol having a molecular weight of about 350 is heated with stirring at 170–180° C. for 2 to 3 hours under a nitrogen atmosphere. A 100 g. sample of the resulting partially esterified copolymer (about 75% half-ester) is blended at room temperature with about 400 ml. of water and 15 g. of N,N, N',N'-tetra (hydroxyethyl) ethylene diamine. To 100 g. of the resulting (about 30%) solution of the alcohol-amine salt of the partially esterified copolymer are added 467 g. of a 15 weight percent aqueous solution of a 90% hydrolyzed polyvinyl alcohol (Airco 624) and the combined solutions blended at 40° C. When completely mixed the resultant blend is allowed to stand several hours for removal of entrapped air.

Using a doctor blade set at 18–20 mils, a small sample of the blend is drawn down on a clean glass plate. The plate is placed in a 120° C. oven for 15 minutes. The resulting dried film, about 1.4–2 mils thick, is cooled and stripped from the plate. When tested on an Instron Tensile Test Machine, the PVA film containing the plasticizing component of the present invention exhibits a stress-strain curve which has an overall positive slope and only a slight inflection point. The curve represents a significant improvement over that observed for a similar film prepared in the same manner but, instead of the alcoholamine salt, prepared with a sodium salt of the partially-esterified copolymer. The stress-strain curve of the latter film has a definite yield point (as opposed to a slight inflection) where the slope of the curve changes from positive to negative. Another difference observed in the two curves is the presence of a substantially linear region in that of the sodium salt-containing film over which Hooke's Law is obeyed, i.e., stress is proportional to strain; no such linear region is observed in the film prepared from the composition of the present invention.

In order to duplicate the presently observed desirable stress-strain relationship in a film prepared from the above-mentioned sodium salt-containing composition, it is usually necessary to incorporate in the latter an external plasticizer, such as triethylene glycol. As mentioned earlier, the properties of the compositions of the present invention, which permit the formation of films having excellent stress-strain relationships without the presence of external plasticizers, obviates the problems of plasticizer migration.

EXAMPLES II–III

Similar results are obtained where the N,N,N',N'-tetra (hydroxyethyl) ethylene diamine in Example I is replaced with tris (hydroxymethyl) aminomethane or 2-amino-2-methylpropane-1,3-diol.

It is claimed:
1. A composition comprising a major amount of polyvinyl alcohol resin and a minor amount of a water-soluble, alkanolamine salt of an about 10 to 100 percent half-ester of a copolymer of styrene and maleic anhydride, the molar ratio of styrene to maleic anhydride in said copolymer being from about 1:1 to 4:1, the unesterified molecular weight of said copolymer being about 400 to 10,000, said copolymer being esterified with an alcohol corresponding to the general formula:

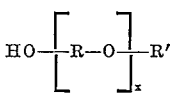

wherein R is alklene of 2 to about 5 carbon atoms, R' is alkyl of 1 to about 5 carbon atoms, and $x$ is 2 to about 20, and said alkanolamine being selected from the group consisting of:

(1)

and (2)

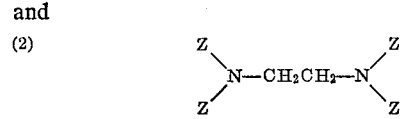

wherein Z in the formulae is selected from the group consisting of hydrogen, lower alkyl and lower hydroxyalkyl, with the proviso that at least two of the Z's are lower hydroxyalkyl.

2. The composition of claim 1 wherein the alkanolamine is N,N,N'N'-tetra (hydroxyethyl) ethylene diamine.

3. The composition of claim 1 wherein the alkalolamine is tris (hydroxymethyl) aminomethane.

4. The composition of claim 1 wherein the alkanolamine is 2-amino-2-methylpropane-1,3-diol.

5. The composition of claim 1 wherein the amount of the salt is about 5 to 40%, based on the combined weight of the polyvinylalcohol resin and the salt.

6. A film cast from an aqueous solution of the composition of claim 1.

7. A film cast from an aqueous solution of the composition of claim 2.

8. A film cast from an aqueous solution of the composition of claim 3.

9. A film cast from an aqueous solution of the composition of claim 4.

10. A film cast from an aqueous solution of the composition of claim 5.

References Cited

UNITED STATES PATENTS

| 2,609,350 | 9/1952 | Spatt | 260—29.6 |
| 2,612,486 | 9/1952 | Cameron | 260—29.6 |
| 3,106,543 | 10/1963 | Milne | 260—874 |
| 3,243,398 | 3/1966 | Bonzagni | 260—874 |

SAMUEL H. BLECH, Primary Examiner

U.S. Cl. X.R.

252—90; 260—29.6, 78.5